United States Patent [19]

Christell et al.

[11] Patent Number: 5,025,044

[45] Date of Patent: Jun. 18, 1991

[54] EXTRUSION ISOLATION OF BLENDS OF RUBBER AND ASPHALT

[75] Inventors: Lance A. Christell, Prospect, Ky.; Fred Y. Kafka, Parkersburg, W. Va.

[73] Assignee: E. I. Du Pont de Nemours and Company, Wilmington, Del.

[21] Appl. No.: 586,855

[22] Filed: Sep. 25, 1990

Related U.S. Application Data

[63] Continuation-in-part of Ser. No. 429,581, Oct. 31, 1989, abandoned.

[51] Int. Cl.$^5$ .......................... C08J 3/20; C08L 95/00
[52] U.S. Cl. ..................................... 523/334; 523/339; 524/59; 524/71; 528/502; 528/936
[58] Field of Search ................... 523/334, 339; 524/59, 524/71; 528/502, 936

[56] References Cited

U.S. PATENT DOCUMENTS

| | | | |
|---|---|---|---|
| 4,081,582 | 3/1978 | Blumel et al. | 524/71 |
| 4,103,074 | 7/1978 | Hertel et al. | 528/936 |
| 4,136,251 | 1/1979 | Bice et al. | 528/486 |
| 4,299,952 | 11/1981 | Pingel et al. | 528/936 |
| 4,621,108 | 11/1986 | Burris | 523/346 |
| 4,778,852 | 10/1988 | Futamura | 524/505 |

FOREIGN PATENT DOCUMENTS 58-183235 10/1983 Japan .

Primary Examiner—Allan M. Lieberman

[57] ABSTRACT

Blends of asphalt emulsions or melts and aqueous elastomeric latices are prepared using a screw type extruder adapted to provide sufficient back pressure within the screw flights of the extruder to express the water from the blend through a vent provided in the extruder.

13 Claims, 2 Drawing Sheets

EXTRUSION ISOLATION OF BLENDS OF RUBBER AND ASPHALT

BACKGROUND OF THE INVENTION

Cross-Reference to Related Application

This application is a continuation-in-part of U.S. Application Ser. No. 07/429,581, filed Oct. 31, 199 and now abandoned..

Polychloroprene is typically prepared by an emulsion polymerization process and the resulting polymer isolated by use of a freeze roll or drum dryer technique. In the past, blends of polychloroprene and asphalt have been prepared by mixing emulsions of the two materials. The present invention involves extruder isolation of chloroprene polymers, i.e., homopolymers and copolymers thereof, polystyrene/ butadiene, polyisoprene, or polybutadiene rubber latex and either an asphalt emulsion or molten asphalt. Following chemical or mechanical coagulation in the extruder, the elastomer and asphalt are conveyed by the screws of the extruder which causes water from the resultant mixture to be expressed. The resultant wet elastomer/asphalt blend may be further dried in a reduced pressure section of the extruder or discharged directly from the extruder for external drying.

PRIOR ART

U.S. Pat. No. 30,378 discloses isolating polymers from dispersions thereof using a modified twin screw extruder.

SUMMARY OF THE INVENTION

The present invention relates to a process for simultaneously blending and isolating polymer emulsions with asphalt. The polymeric emulsion is fed to a twin screw extruder along with molten or emulsified asphalt. The extruder screw(s) are (is) fitted with a restrictive section which causes pressure to build up in the rubber upstream. This pressure and its associated shearing action disengages encapsulated water from the blend and, blocking the flow of water downstream past the restriction, forces it to flow from the extruder through an upstream exhaust port. The shearing action also serves to further mix the rubber and asphalt components.

DETAILED DESCRIPTION

Figure 1:
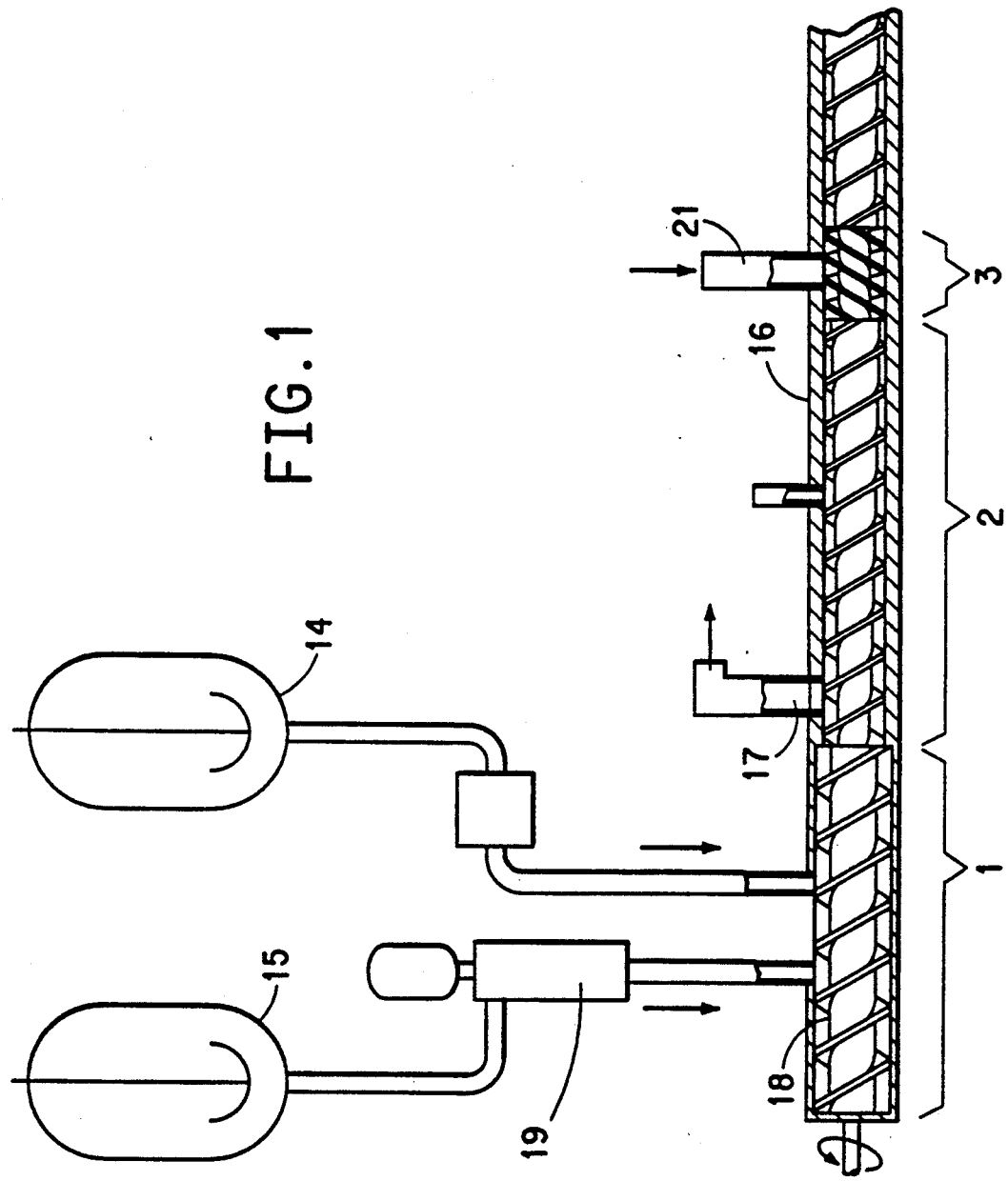
FIG. 1 is a partly diagrammatic, sectional side view of the apparatus used in the process of the present invention.

The present invention is directed to a process for blending elastomeric latices and asphalt and comprises feeding an aqueous emulsion of elastomeric latex selected from the group consisting of chloroprene polymer latexes, polystyrene/butadiene latexes, polyisoprene latexes and, polybutadiene latexes containing 15-70 weight percent elastomer, and asphalt, in the form of a melt or in the form of an emulsion containing 20-70 weight percent asphalt, to a screw extruder having a flow restriction to apply a back pressure sufficient that water present in the aqueous emulsion is forced out of a vent provided in the extruder upstream from said flow restriction to apply back pressure, feeding asphalt and elastomer through said restriction and recovering the thus formed blend of 5 to 98 weight percent asphalt and 2 to 95 weight percent elastomer from said extruder. Preferably, the resulting blend from the extruder contains from 15 to 85 weight percent, and in an especially preferred case, from 25 to 75 weight percent chloroprene polymer, polystyrene/butadiene, polyisoprene, polybutadiene, and from 85 to 15 weight percent, and in an especially preferred case, 75 to 25 weight percent asphalt. These preferred blends can be molded into rubber articles such as treads or mats. The compositions can also be used to form coatings, and additionally, they can be used in paving applications. The products of the present invention also find use as masterbatches for further blending with additional asphalt for use in road building and roofing materials.

More specifically a preferred aspect of the present invention is directed to a composition comprising a bituminous material, i.e. asphalt, having incorporated therein a chloroprene polymer which is an alkyl mercaptan-modified, dialkyl- or dialkoxy xanthogen disulfide-modified polychloroprene, or a chloroprene polymer modified with elemental sulfur, optionally containing up to 20 weight percent 2,3-dichlorobutadiene-1,3, a monoethylenically unsaturated monomer containing from 3 to 10 carbon atoms or mixtures thereof. The ethylenically unsaturated monomer may be further described as a vinyl monomer having a boiling point of from 0° to 200° C. Monomers having boiling points below 0° C. will not be liquids in the polymerization emulsion. Monomers having boiling points above 200° C. create problems in removing unreacted monomers by low pressure steam stripping, the process commonly used to remove unreacted chloroprene from the reaction mixture. Further, the vinyl monomer has to be reactive with 2-chloro-1,3-butadiene and emulsifiable or soluble in water. Preferably the vinyl monomer contains a polar substituent so that the product copolymer retains the resistance to swelling or solvating effect by asphalt provided by polychloroprene rather than the less expensive hydrocarbon rubbers. Thus the preferred vinyl monomers are acrylonitrile; methacrylonitrile, lower alkyl acrylates, methacrylates, acrylamides, methacrylamides, maleates and fumarates; acrylic acid; methacrylic acid; fumaric acid; and maleic acid. The vinyl monomers are generally less reactive than 2-chloro-1,3-butadiene in contrast to 2,3-dichloro-1,3-butadiene which is more reactive. The preferred polychloroprene is an alkyl mercaptan-modified or a dialkyl- or dialkoxy xanthogen disulfide-modified polychloroprene which, preferably, is mercaptan modified. The alkyl mercaptan modifiers suitable for use in the invention generally have chain lengths of about from 4-20 carbon atoms. Dodecyl mercaptan is a particularly preferred mercaptan modifier.

The dialkyl xanthogen disulfides can be represented by the structure

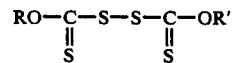

wherein R and R' are alkyl radicals having 1-8 carbon atoms. The preferred dialkyl xanthogen disulfides are those in which each alkyl radical has 1-4 carbon atoms, especially diisopropyl xanthogen disulfide.

The dialkoxy xanthogen disulfides are compositions of the formula

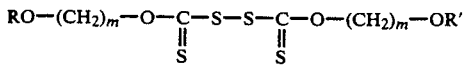

wherein R and R' are alkyl radicals having 1-8 carbon atoms and m is 2 to 6. Examples of suitable alkyl radicals are methyl, ethyl, butyl, and hexyl, with ethyl being preferred. Generally the modifier content of the polymer is from 0.05 to 0.15 weight percent in order to control gel content produced to the desired range. The chloroprene polymer is prepared by emulsion polymerization at 10° to 50° C. Generally the polymerization is stopped at 40 to 90% chloroprene monomer conversion.

The chloroprene polymers which are modified with elemental sulfur contain sulfur in the polymer backbone. These chloroprene polymers are of very high molecular weight, as polymerized, and exist principally in the form of gel. Peptization, a process which breaks the sulfur linkages and lowers the molecular weight to a useful range, is a necessary step in the production of these polymers.

A lower tetraalkylthiuram disulfide can be used to stop polymerization and to initiate peptization. The thiuram disulfide can be conveniently added, for example, as a toluene solution emulsified in water.

At the same time as the thiuram disulfide is added, it is preferred that a free radical scavenger that does not react with the sulfide linkages of the sulfur-modified chloroprene copolymer be added to the latex. Representative free radical scavengers include phenothiazine, dihydric phenols, aralkyl derivatives thereof, and phenolic antioxidants substituted in at least one position ortho to the hydroxy group with a branched alkyl group containing 3-12 carbon atoms.

Styrene/butadiene rubbers are polymerized as an emulsion of generally, from 60 to 75 parts by weight butadiene, from 25 to 40 parts by weight styrene, from 1 to 5 parts by weight emulsifying agent, from 0.1 to 1.0 part by weight, free-radical polymerization catalyst, from 0.1 to 1.0 parts by weight modifying agent, and 100 to 300 parts by weight water, at 40° C. to 60° C.

The polybutadiene elastomers suitable for use herein can be produced by a variety of processes. One such suitable process is free-radical polymerization in emulsion initiated by an active free-radical R formed by the decomposition of a peroxide, persulfate or similar free radical forming reaction.

Poly-1,4-isoprene elastomers suitable for use herein include the natural rubbers (both Hevea and Balata) and synthetic polyisoprene. The synthetic polyisoprenes can be emulsion polymerized in an aqueous system using free-radical initiation. Suitable free-radical initiators are potassium persulfate or a redox system using cumene hydroperoxide-iron pyrophosphate. The molecular weight is controlled by addition of a mercaptan such as dodecyl mercaptan.

The amount of elastomer in the elastomer latex is from 15-70 weight percent, preferably 30-60 weight percent, and usually the elastomer latexes contain at least about 45 weight percent elastomer.

Generally the asphalt employed in the process will have a viscosity of less than about 8,000 Poise (at 140° F.), preferably less than about 4,000 Poise (at 140° F). Outstanding materials are produced from asphalt having a viscosity of about 500 Poise to about 2,000 Poise (at 140° F.) or less. Asphalt materials which are suitable may be selected from those which are typically used for road paving, repair and maintenance purposes as well as those generally used for roofing and coating purposes. Thus, such asphalt includes natural asphalt, petroleum asphalt and petroleum tar. The natural asphalts include, for example, Canadian western slope asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Preferably, the asphalt which will be employed is an asphalt cement of the type typically used for road paving, repair and maintenance purposes. Such asphalts typically have penetrations ranging between about 20 to about 200 with AC-5 paving grade asphalt being especially suitable. The asphalt may be fed to the extruder as an anionic or cationic emulsion or as a melt. A particularly suitable asphaltic feed for polychloroprene and styrene/butadiene rubber is RS-2 anionic asphalt emulsion.

The asphalt can be added as a melt, i.e., 100 weight percent asphalt, or the asphalt can be added in the form of an emulsion. When used in the form of an emulsion, the amount of asphalt in the emulsion is from about 20 to 70 weight percent, preferably 50-70 weight percent. The addition of asphalt in the form of an emulsion is preferred.

In one aspect of the invention, whatever elastomeric latex or latices are to be used can be preblended with an emulsion of asphalt. Generally this is done using a conventional low intensity mixing apparatus. Thus one or more elastomeric latices such as a chloroprene polymer latex, a polystyrene/butadiene rubber latex, polyisoprene rubber latex or a polybutadiene rubber latex can be blended with an asphalt emulsion and the resultant blend fed to the specialized dewatering extruder. Alternatively, one or more elastomeric lactices can be fed to the specialized dewatering extruder and molten asphalt fed to the extruder preferably at a point downstream from the point at which water is removed from the extruder, but upstream from the restriction in the extruder which provides the back pressure used to facilitate removal of water. As can be seen a variety of combinations are envisioned by the present invention.

DETAILED DESCRIPTION OF THE DRAWINGS

Referring to FIG. 1, 15 is a stirred storage tank containing elastomeric latex mixed with an asphalt emulsion; 14 is a storage tank containing a coagulant solution such as aqueous calcium chloride; 16 is a twin-screw extruder housing containing screws 18, one of which is shown in FIG. 1. The extruder is divided into the following zones; 1, the elastomer coagulation zone; 2, the liquid separation zone; and 3, the pressure seal. Optionally the extruder may also, and preferably does, feature a subatmospheric pressure zone; and a polymer removal zone. The pressure rises high enough to force the low viscosity fluid to move counter to the screw movement. Waste liquid is removed through port 17. However, to prevent loss of polymer with the waste liquid, a mechanical dewatering device can be installed at that point. This can be, for example, a twin-screw mechanism, which returns elastomer to the extruder. The pressure seal 3 may be one of several devices known to those skilled in extruder technology for providing a high back pressure. Shown in the figures are reverse pitch screw flight sections which are often used for this purpose.

Remaining liquid can be removed from the polymer by means of a vacuum pump communicating with one or more vacuum ports downstream from pressure seal 3. These ports can be quite large, to provide for efficient evacuation.

Figure 2:
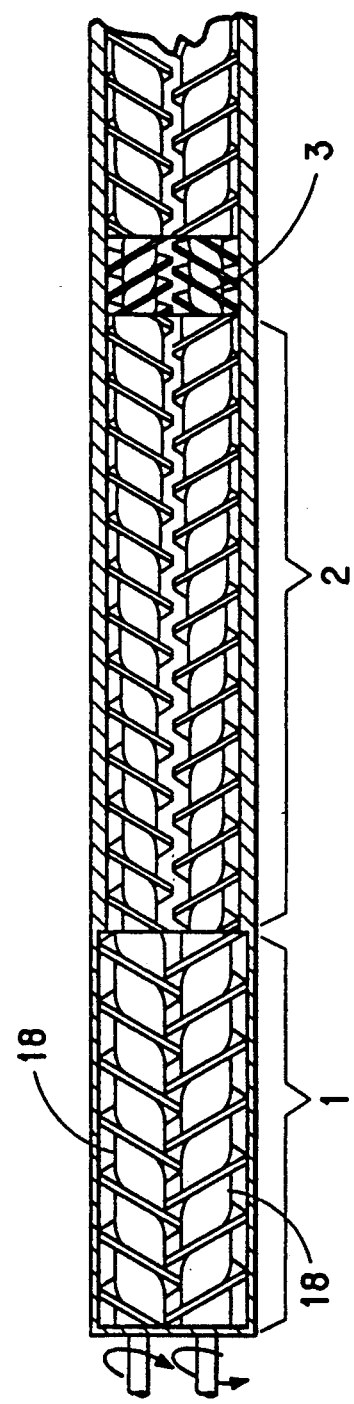
FIG. 2 is a simplified, sectional top view of the extruder screws, showing the arrangement of their flights.

Both screws 18 are seen in FIG. 2. It can be seen that in zone 1 the screw flights intermesh, while in zone 2, they do not intermesh but are tangential. In fact, while intermeshing, counter-rotating, or co-rotating (not shown) twin screws are preferred for their good venting characteristics and resistance to fouling, non-intermeshing twin screws are also suitable provided a suitable high pressure metering pump is used to force emulsion into the extruder. In the extreme, it is also feasible to operate the process of this invention in an extruder having only one screw provided material can be metered to the extruder against erratic pressure. The blend can be extruded downstream through one or more dies which may also serve as the pressure seal. The screw channels in the downstream zone can be made shallower toward the end of the extruder, so that a good pumping action may be obtained. The drawings are simplified in that they do not show various details obvious to those skilled in the art. For example, the housing is shown without any heat transfer means. Obviously, heating or cooling by means of various fluids circulating through a jacket is possible, as well as use of electric heaters or of heating or cooling coils.

In the operation of one embodiment of the process of this invention, elastomer latex and asphalt emulsion are mixed in tank 15 and introduced near the start of the screws by means of a pump or metering device 19. A coagulant can be injected slightly upstream or downstream of the latex injection point and the resulting mixture of coagulum and water conveyed forward toward the pressure seal, which may be, for example, a section of reverse pitch segments of screws as shown or a section in which clearances between the depth of the screw flights or cylindrical sections and the housing are reduced to provide a restriction and, therefore, high pressure at the seal. The pressure seal may be fitted with a barrel valve 21 which can be adjusted to control back pressure.

Water or other liquid separated from the polymer during the coagulation process cannot pass the pressure seal section and is removed through port 17 in zone 2. Residual water held by the elastomer which passes through the pressure seal can be substantially removed downstream in a zone which is maintained at a pressure below about 200 mm Hg and a temperature of about 100° C. or higher. The final chloroprene polymer leaving the extruder generally contains no more than about 15 weight percent moisture.

Suitable coagulants for use with chloroprene polymers include salts such as calcium chloride, aluminum sulfate, sodium chloride, sodium sulfate, or sodium acetate which may be used alone or in admixture with mineral acids or carboxylic acids. The preferred salt is calcium chloride. The acids are added to control waste water pH which may impact product properties. The preferred coagulant concentration depends to a large extent on obtaining a coagulant induced flow rate not too much different from that of the latex, so as not to cause mixing problems in the coagulation zone.

Water-dispersible thickeners also can be used in this process. They can be added with the latex, with the coagulant, or as a separate stream. The thickener increases the efficiency of coagulation and minimizes the amount of dispersed polymer in the effluent water. Suitable thickeners include, for example, hydroxyethyl cellulose, various starches, gums, polymeric acrylic gums, and peptides known to those skilled in the art.

This invention is now illustrated by the following examples of certain preferred embodiments thereof, where all parts, proportions, and percentages are by weight unless otherwise indicated.

EXAMPLES

Example 1

Commercial Neoprene 735 A, available from Du Pont (10.7kg), of poly-2-chloro-1,3-butadiene latex, having a solids content of 46%, prepared with dodecyl mercaptan using a sodium disproportionated resinate emulsifier was blended with 7.4kg RS-2 anionic asphalt emulsion having a solids content of 67 weight percent (available from Chevron) to give a 50/50 mixture of asphalt/rubber solids as an emulsion. This mixture was fed to a counter-rotating twin screw dewatering extruder having an overall barrel length-to-diameter ratio of 26 and 20 mm screw centerline-to-centerline distance. The 274 mm long intermeshing double-flighted screw section consisted of screws 24 mm in outside diameter. The intermeshing screw section was followed by a 193 mm length of non-intermeshing conveying screws 20 mm in outside diameter. A 15 mm length of 20 mm diameter opposed cylindrical restricting elements under a barrel valve formed the next section of the extruder. The final section consisted of a 31 mm length of 20 mm diameter non-intermeshing conveying screws. The latex blend was introduced into the screw nip at a point 104 mm down the length of the intermeshing screw section. A coagulant solution of 20% calcium chloride was introduced at 3kg/hour through a port 127 mm down the length of the intermeshing screw section. The latex blend coagulated and the resultant mixture of coagulum and water was conveyed forward to a port centered 328 mm down the length of the screws where the bulk of the water, substantially free of rubber and asphalt, was removed through a 20 mm outer diameter twin screw counter-rotating vent port stuffer. The wet polymer blend was expressed past the opposed cylindrical restrictions with the barrel valve set two turns open and then discharged from the open bores of the extruder barrel at 17kg/hour as a wet, well compounded rope. The throughput was 13 dry kg/hr and the peak drive power at 497 rpm was 1 kw. The extruded blend was continuously dried by 140.C air in a vibratory conveyor.

To 100 parts of the above rubber/asphalt blend was added 1 part of phenyl-alpha-naphthylamine, 8 parts magnesium oxide, 10 parts zinc oxide, and 0.93 parts ethylenethiourea. This mixture was compounded for 6 minutes on a smooth rubber mill at 50° C., with the gap set to maintain a working bank of material about 1 inch deep. The material was "cigar rolled" 6 times, then passed through the mill once more to generate a slab about 3/8 inch thick. A sample analyzed on a Monsanto Rheograph set at 160° C., and 1 degree arc gave a scorch time of 13.25 minutes and an ML100 value of 5.0.

Example 2

The polychloroprene latex of Example 1 was mixed with RS-2 asphalt emulsion to give a rubber/asphalt blend having a 95/5 ratio of rubber solids to asphalt and coagulated with 20 weight percent aqueous calcium chloride solution at a rate of 3kg/hour. The extruder assembly was similar to that used in Example 1, except for an increased overall barrel length-to-diameter ratio with the same 274 mm long intermeshing screw section, followed by 295 mm of non-intermeshing conveying screws, 30 mm of shallow flighted restricting screws, and terminating with 30 mm of further conveying screws to carry the coagulated rubber out of the open bores of the extruder. No barrel valve was installed. Water was removed through the vent port stuffer, mounted as before. The wet polymer emerged at 8 kg/hour as a well compounded rope. The throughput was 7 dry kg/hour and the peak drive power at 500 rpm was 2 kw. The extrudate was dried in room temperature air for several days, then compounded as in Example 1 and the results are reported in Table I. The procedure described above was repeated except no asphalt was used in the process.

TABLE I

|  | ML100 | Scorch | Cure Time |
|---|---|---|---|
| Blend/CaCl2 Coagulant | 65 | 3.1 | 14.5 |
| Control (No Asphalt) | 68 | 3.7 | 14.5 |

Example 3

The polychloroprene latex of Example 1 was mixed with RS-2 asphalt emulsion to give a rubber/asphalt blend having 2/98 ratio of rubber solids to asphalt (% by weight) and coagulated in the extruder of Example 2 using 20% calcium chloride coagulant. No water was removed from the vent port stuffer. Instead, clear water and a separate phase of smooth, viscous liquid asphalt flowed from the extruder discharge at a nominal dry rate of 1.4 kg/hour. At 247 rpm, the peak drive power was negligible.

Example 4

A styrene/butadiene rubber latex (Butanol NS Anionic SBR Latex, available from BASF) containing 74% solids was mixed with RS-2 asphalt emulsion to give a rubber asphalt blend having a rubber solids:asphalt ratio of 75:25 and coagulated per Example 2. The extruded compound appeared well mixed.

Example 5

RS-2 asphalt emulsion diluted to 28% solids with water was injected into the extruder of Example 2 104 mm down the length of the screw. Polybutadiene homopolymer latex (8419 Latex, available from Synpol) containing 21% solids was injected 127 mm down the screw at 17 kg/hr to give a rubber/asphalt blend having a rubber solids:asphalt ratio of 50:50. A 20% aqueous solution of calcium chloride was injected 226 mm down the screw. Clear water was removed through the vent port stuffer, located as before. A satisfactory blend was expresssed, containing about 10% water. At 200 rpm screw speed, peak drive power was 0.5 kw.

Example 6

Diluted RS-2 asphalt emulsion, High Ammonia Natural Rubber Latex, available from Vultex, and 20% calcium chloride coagulant were injected into the extruder per Example 5 at rates of 13, 5, and 3 kg/min, respectively, to produce a rubber/asphalt blend having a rubber solids:asphalt ratio of 50:50. Water from the vent port stuffer was substantially free of asphalt and rubber. A good blend was expressed, containing about 10% water. Screw speed and peak drive power was the same as Example 5.

Example 7

Neoprene 735A was injected into the extruder of Example 2 104 mm down the screw at a rate of 10 kg/hr and 20% calcium chloride coagulant was injected 226 mm down the screw at 3 kg/hr. Clear water was removed from the vent port stuffer. Immediately downstream of the vent port stuffer, molten AC-10 Asphalt, available commercially from Chevron, was injected by means of a gear pump to make a blend of asphalt and rubber containing a rubber solids:asphalt ratio of 50:50. The expressed compound contained about 17% water and exhibited small millimeter scale lumps in a shiny, fluid matrix. At 200 rpm, peak drive power as 0.7 kw.

We claim:

1. A process for blending elastomeric latices and asphalt comprising feeding an aqueous emulsion of elastomeric latex selected from the group consisting of chloroprene polymer latexes, polyisoprene latexes, polystyrene/butadiene latexes, and polybutadiene latexes containing 15 to 70 weight percent elastomer, and asphalt in the form of a melt or in the form of an emulsion containing 20–70 weight percent asphalt to a screw extruder having a flow restriction to apply a back pressure sufficient that water present in the aqueous emulsion is forced out of a vent provided in the extruder upstream from said flow restriction to apply back pressure, feeding asphalt and elastomer through said restriction and recovering the thus formed blend of 5 to 98 weight percent asphalt and 2 to 95 weight percent elastomer from said extruder.

2. The process of claim 1 wherein the asphalt fed to the extruder is in the form of an emulsion.

3. The process of claim 2 wherein the elastomeric latex is blended with an asphalt emulsion prior to feeding to the extruder.

4. The process of claim 1 wherein the asphalt is fed to the extruder in the form of a melt upstream of or at the pressure seal.

5. The process of claim 2 wherein the elastomer emulsion fed to the extruder contains 30–60 weight percent elastomer.

6. The process of claim 1 wherein the asphalt and elastomeric latex are fed separately to the extruder.

7. The process of claim 1 wherein the polymer is a chloroprene polymer.

8. The process of claim 1 wherein the asphalt used in the process has a viscosity from 500–8000 Poise.

9. The process of claim 7 wherein the asphalt used in the process has a viscosity from 500–2000 Poise.

10. The process of claim 7 wherein the chloroprene polymer consists essentially of repeating units derived from chloroprene and up to 20 weight percent of another monomer from the group consisting of 2,3-dichloro-1,3-butadiene and vinyl monomers copolymerizable with chloroprene and having a boiling point of from 0° to 200° C.

11. The process of claim 10 wherein the vinyl monomer is selected from the group consisting of acrylonitrile; methacrylonitrile; lower alkyl acrylates, methacrylates, acrylamides, methacrylamides, maleates, and fumarates; acrylic acid; methacrylic acid; maleic acid and fumaric acid.

12. The process of claim 10 wherein the chloroprene polymer contains up to 35 weight percent gel.

13. The process of claim 10 wherein the other monomer in the chloroprene polymer is 2,3-dichloro-1,3-butadiene.

* * * * *